(12) United States Patent
Fried et al.

(10) Patent No.: US 10,514,934 B2
(45) Date of Patent: *Dec. 24, 2019

(54) GENERIC PHYSICAL LOCATION CODES FOR VIRTUAL SYSTEM AND PARTITION CLONING

(71) Applicant: International Business Machines Corporation, Armonk, NY (US)

(72) Inventors: Eric P. Fried, Austin, TX (US); Swaroop Jayanthi, Bangalore (IN); Thangadurai Muthusamy, Bangalore (IN); Amartey S. Pearson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,744

(22) Filed: Jun. 21, 2017

(65) Prior Publication Data

US 2017/0286137 A1 Oct. 5, 2017

Related U.S. Application Data

(63) Continuation of application No. 14/292,367, filed on May 30, 2014, now Pat. No. 9,740,509.

(51) Int. Cl.
*G06F 9/445* (2018.01)
*G06F 13/42* (2006.01)
(Continued)

(52) U.S. Cl.
CPC ...... *G06F 9/44505* (2013.01); *G06F 9/45558* (2013.01); *G06F 13/385* (2013.01);
(Continued)

(58) Field of Classification Search
CPC .............. G06F 9/44505; G06F 13/385; G06F 13/4068; G06F 13/4221; H05K 999/99
(Continued)

(56) References Cited

U.S. PATENT DOCUMENTS 7,756,954 B2 7/2010 Schmidt et al.
7,941,470 B2 5/2011 Le et al.
(Continued)

OTHER PUBLICATIONS

"Determining the DRC Index for a Card Slot", IBM, Mar. 22, 2013, 2 pages.
(Continued)

*Primary Examiner* — Paul R. Myers
(74) *Attorney, Agent, or Firm* — DeLizio Law, PLLC

(57) ABSTRACT

A cloned configuration of a source machine is created by determining a first set of physical location codes for a source machine. A map is generated based on the sorted physical location codes that maps the first set of physical location codes to a first set of generic location codes. A second set of physical location codes associated with a second set of adapter slots in a target machine is generated. A second map is generated based on the sorted second set of physical location codes that maps the second set of physical location codes to a second set of generic location codes. A third set of physical location codes is generated based on the first set of generic location codes and the second map. If an entry in the third set of physical location codes is not present the second set of physical location codes, an error is generated.

19 Claims, 8 Drawing Sheets

(51) Int. Cl.
*G06F 13/40* (2006.01)
*G06F 13/38* (2006.01)
*G06F 9/455* (2018.01)

(52) U.S. Cl.
CPC ...... *G06F 13/4068* (2013.01); *G06F 13/4221* (2013.01); *G06F 2009/45562* (2013.01)

(58) Field of Classification Search
USPC .......................................................... 710/308
See application file for complete search history.

(56) References Cited

U.S. PATENT DOCUMENTS

| | | | |
|---|---|---|---|
| 8,151,263 | B1 | 4/2012 | Venkitachalam et al. |
| 8,336,046 | B2 | 12/2012 | Bowman et al. |
| 8,688,636 | B1 | 4/2014 | Barve |
| 9,727,320 | B2* | 8/2017 | DeHaan .................. G06F 8/60 |
| 9,740,509 | B2* | 8/2017 | Fried .................. G06F 9/44505 |
| 9,766,907 | B2* | 9/2017 | Fried .................. G06F 13/4221 |
| 2007/0186025 | A1 | 8/2007 | Boyd et al. |
| 2009/0019137 | A1 | 1/2009 | Mishra et al. |
| 2009/0150510 | A1 | 6/2009 | Kovacs et al. |
| 2009/0241108 | A1 | 9/2009 | Edwards et al. |
| 2011/0004585 | A1 | 1/2011 | Becker et al. |
| 2011/0154331 | A1 | 6/2011 | Ciano et al. |
| 2012/0150805 | A1 | 6/2012 | Pafumi et al. |
| 2012/0150816 | A1 | 6/2012 | Pafumi et al. |
| 2012/0246640 | A1 | 9/2012 | Marshall et al. |
| 2012/0265959 | A1 | 10/2012 | Le et al. |
| 2013/0031342 | A1 | 1/2013 | French |
| 2013/0263122 | A1 | 10/2013 | Levijarvi et al. |
| 2014/0006734 | A1 | 1/2014 | Li et al. |

OTHER PUBLICATIONS

"U.S. Appl. No. 14/292,367 Office Action", dated Feb. 23, 2017, 11 pages.

"U.S. Appl. No. 14/476,306 Office Action", dated Feb. 24, 2017, 7 pages.

* cited by examiner

GENERIC PHYSICAL LOCATION CODES FOR VIRTUAL SYSTEM AND PARTITION CLONING

RELATED APPLICATIONS

This application is a Continuation of, and claims the priority benefit of, U.S. application Ser. No. 14/292,367 filed May 30, 2014.

BACKGROUND

Embodiments of the inventive subject matter generally relate to the field of computer systems, and, more particularly, to using generic location codes for cloning physical and virtual systems.

In today's world, virtualization is an important aspect of many large scale computing environments, including data center environments and cloud environments. Such environments typically benefit from elasticity, reliability and security. Cloning physical and virtual machines is commonly used to address scalability and customer demand in a data center or other computing environments with large numbers of similarly configured computer systems.

Cloning addresses the problem of solving the similar types of configuration typically desired for systems across one or more data centers. But cloning input output (I/O) device configuration can be a big challenge in a data center environment and typically requires much manual intervention. For example, in such environments a System Administrator typically has to map all the physical hardware positions to the internal location codes which appear in management software, often using home-grown processes and naming conventions to facilitate this mapping.

A major problem with these manual processes is that the processes have to be disseminated and understood by everyone that configures such systems. Further, the mapping of configurations from one machine to another is still manual and prone to human error.

SUMMARY

Various implementations of a method, system and computer program product determine a first set of physical location codes associated with a first set of adapter slots in a source machine. The first set of physical location codes is then sorted. A map is generated based on the sorted physical location codes, where the map includes a mapping of the first set of physical location codes to a first set of generic location codes.

A second set of physical location codes associated with a second set of adapter slots in a target machine is generated. The second set of physical location codes is sorted. A second map is generated based on the sorted second set of physical location codes that maps the second set of physical location codes to a second set of generic location codes. A third set of physical location codes is generated based on the first set of generic location codes and the second map. If an entry in the third set of physical location codes is not present the second set of physical location codes, an error is generated.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to cloning physical configurations, virtual configurations may also be cloned. In other instances, well-known instruction instances, protocols, structures and techniques have not been shown in detail in order not to obfuscate the description.

A target computing system can be configured by cloning a source computing system. In particular implementations, physical location codes that are used in the configuration of the source computing system and are unique to the source computing system are converted to generic location codes. The physical location codes are read from the source computing system and sorted. The generic location codes can be stored in a configuration template. When the configuration template is to be applied to the target computing system, the physical location codes are read from the target computing system and sorted. The physical location codes from the target computing system are then mapped to the generic location codes, and the mapping is used to create a configuration for the target computing system.

Figure 1:
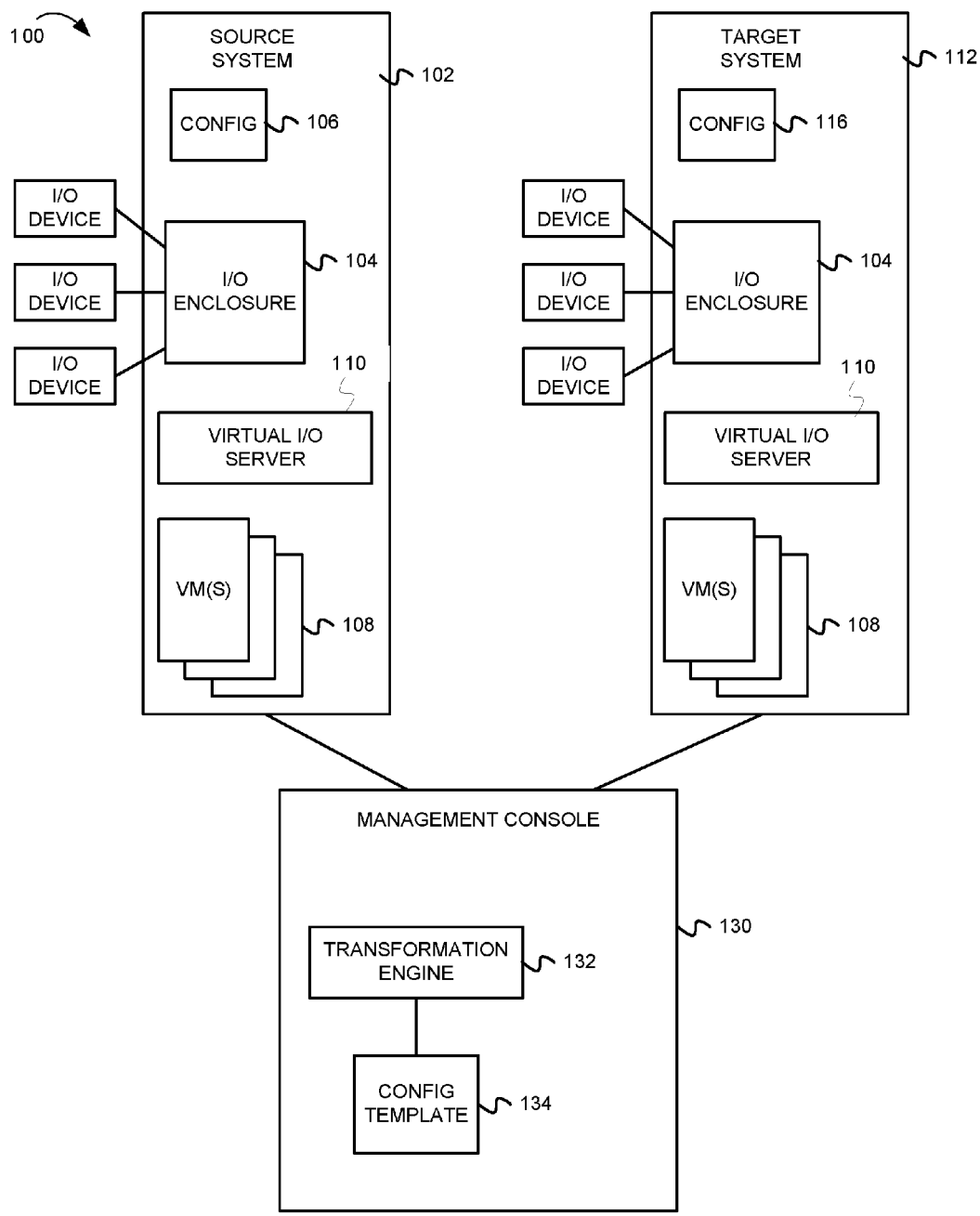
FIG. 1 depicts a system according to embodiments.

FIG. 1 depicts a system 100 for cloning a source system according to embodiments. System 100 includes a source system 102, a target system 112 and a management console 130. In the example illustrated in FIG. 1, source system 102 serves as a baseline system that is "cloned" to create other systems (e.g., target systems) that are configured in substantially way as the source system 102. Source system 102 can include one or more input/output (I/O) enclosures 104. An I/O enclosure 104 can provide a physical interface for various types of adapters that couple source system 102 to networks, storage devices or other external devices. An I/O enclosure 104 may include slots in which adapter cards can be inserted. Further, an I/O enclosure 104 may include one or more planes having slots in which adapter cards can be inserted. Thus an enclosure can be organized as one or more planes, where each plane has one or more slots configured to receive adapter cards.

An adapter card can be assigned a physical location code that can be used in configuring source system 102. An example of a physical location code is "U78A5.001.WIHO163-P1-C1." The first portion of the physical location code can be referred to as a unit location code and uniquely identifies the I/O enclosure containing the adapter. For the example physical location code, the prefix "U78A5.001.WIHO163" is a unit location code uniquely identifying a particular enclosure. The "P1-C1" identifies the plane and card slot that holds the adapter card. In this example, P1 refers to plane 1 of the adapter and C1 refers to card slot 1 of plane 1 in the enclosure with the unique identifier "U78A5.001.WIHO163."

System 102 can include one or more virtual machines 108. A virtual machine may also be referred to as a partition. Each virtual machine can execute an operating system and applications within the virtual machine. The operating system and applications running on one virtual machine may be completely different from the operating system and applications running on other virtual machines. For example, one virtual machine may be running an accounting system on the AIX operating system while another virtual machine may run file server applications on a Linux operating system. Alternatively, a virtual machine may run the same operating system and applications as another virtual machine and serve as a backup in case of a failure or overload in the other virtual machine. From the point of view of a virtual machine, the virtual machine appears to be an independent computer that controls the underlying hardware when in reality, each virtual machine is sharing hardware resource with other virtual machines. For instance, adapter cards in an I/O enclosure 104 can be dedicated to a particular virtual machine or can be configured to be shared by multiple virtual machines. As an example, a network adapter in an I/O enclosure 104 may be shared by multiple virtual machines such that each virtual machine is allocated a port of the network adapter or allocated a particular amount of bandwidth provided by the network adapter.

Source system 102 may include a virtual I/O server 110 in some implementations. Virtual I/O server 110 can be a specialized virtual machine that manages the allocation and mapping of adapter card functionality to the various virtual machines 108 on source system 102. Virtual I/O server 110 may determine allocations and mappings of adapter cards using data read from configuration 106. For example, configuration 106 may specify mappings of adapter cards to virtual machines. Such mappings may use physical location codes that are, as noted above, unique to the system being configured.

Management console 130 can provide administration, operation and maintenance functions for system 100. Management console 130 may be used to configure target systems, including cloning a source system to a target system. Examples of management consoles include the HMC (Hardware Management Console), SDMC (System Director Management Console) and IVM (Integrated Virtualization Manager) management consoles.

Management console 130 can include a transformation engine 132. Transformation engine 132 reads physical location codes and converts the physical location codes to generic location codes. Transformation engine 132 can then create a configuration template 134 that includes the generic location codes and other configuration data for use in cloning source system 102.

Target system 112 may have a hardware and software configuration that is the same or substantially similar to that of source system 102. For example, target system 112 may include one or more I/O enclosures 104 and virtual machines 108. Target system 112 may also have the same or similar adapter cards in its I/O enclosures 104 as source system 102. Other components such as processor, memory, operating system etc. (not shown) may also be the same or similar as source system 102. Further, target system 112 may be cabled to storage devices and network devices using the same adapters and adapter ports as source system 102.

Management console 130 may be used to clone some or all of a configuration of source system 102 to target system 112. As part of the cloning process, generic location codes created from physical location codes that are unique to source system 102 may be mapped to physical location codes that are unique to target system 112. Further details on such a cloning process are provided below.

Figure 2:
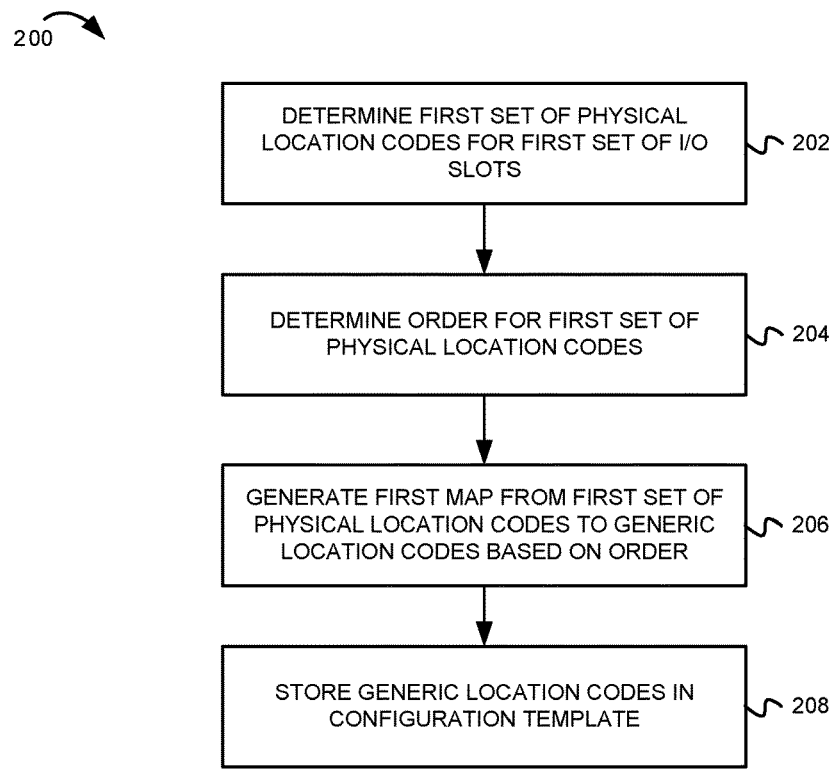
FIG. 2 is a flowchart illustrating a method for generating generic location codes for use in configuring a cloned system.

FIG. 2 is a flowchart illustrating a method 200 for generating generic location codes for use in configuring a cloned system. Method 200 begins at block 202 by determining a first set of physical location codes on a source system. For example, a set of physical location codes associated with card slots in an I/O enclosure 104 may be determined. The physical location codes may be determined as part of a discovery process that is executed on the source system.

At block 204, the physical location codes are sorted. In some implementations, the physical location codes are sorted in the order that devices or slots associated with the physical location codes were discovered. For example, a physical location code may be associated with an index that indicates the discovery order of the device or slot associated with the physical location code. In particular implementations, a Dynamic Reconfiguration Connector Index (DRCI) indicates the discovery order. Those of skill in the art having the benefit of the disclosure will appreciate that other orders may be used in addition to or instead of discovery order. Any ordering methodology that provides a reliable and consistent ordering of physical location codes across the same or similar hardware configurations may be used.

At block 206 a map is generated that maps the physical location codes to generic location codes. In some embodiments, a unique portion of the physical location code is replaced by a generic location portion. Using the example above, the prefix (unit location code) "U78A5.001.WIHO163" of the physical location code "U78A5.001.WIHO163-P1-C1" may be replaced by a generic portion "aaa" such that the generic location code becomes "aaa-P1-C1." A generic portion may be any string that is generated in a reliable and consistent manner based on an ordering. For example, a first generic portion for an I/O disclosure that is discovered first may be "aaa", a second portion for a second I/O enclosure may be "aab" and a third generic portion for an I/O enclosure that is discovered third may be "aac" etc. The map of physical location prefixes to generic prefixes may be used to map physical location codes to generic location codes.

At block 208, the generic location codes are stored in a configuration template. The method then ends. In some embodiments, only generic location codes that correspond to physical location codes that have been actually assigned or allocated to virtual machines or other software components of the source system are included in the configuration template. Physical location codes that are not assigned or allocated to any virtual machines or software components are ignored and omitted from the configuration template.

Figure 3:
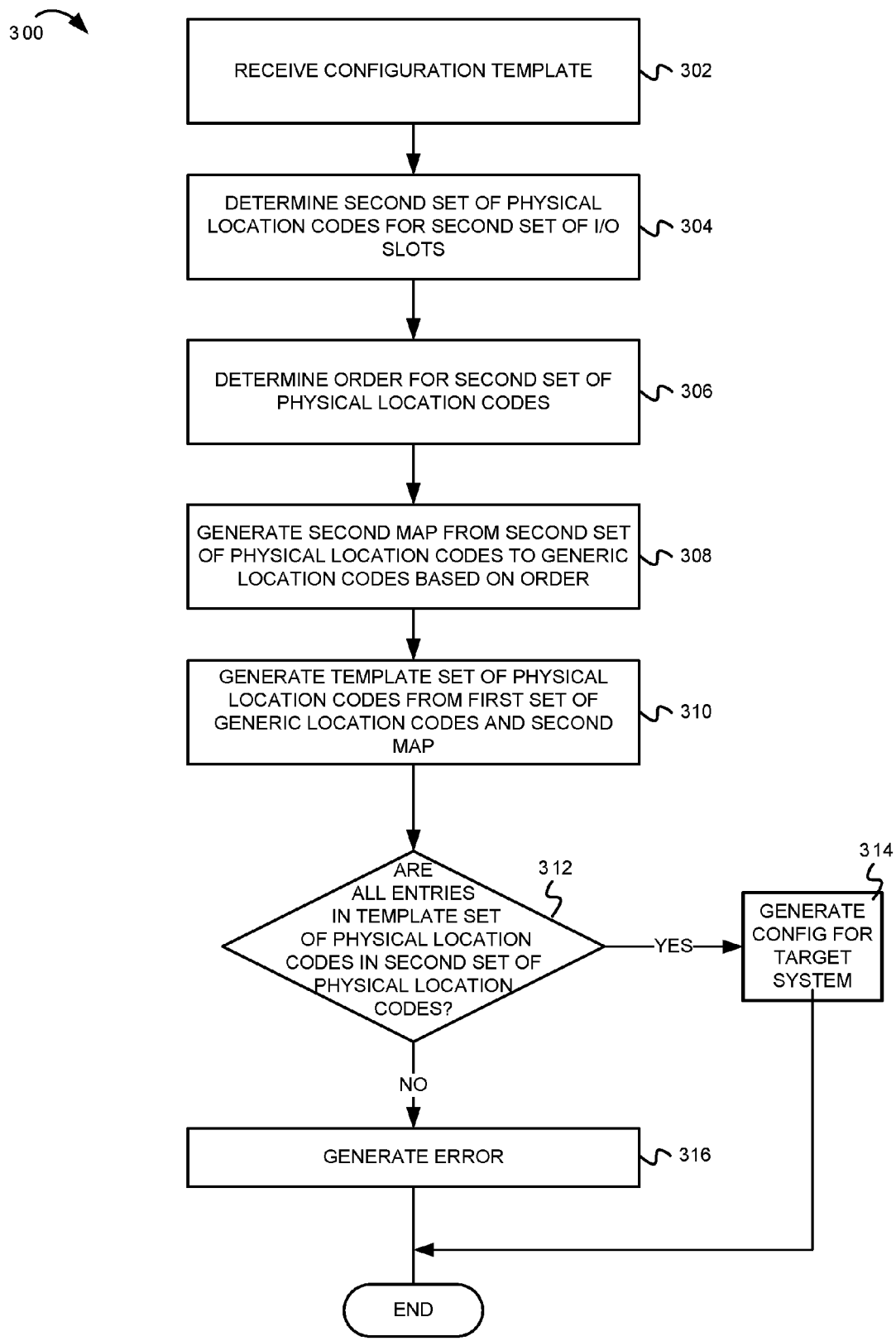
FIG. 3 is a flowchart illustrating a method for using generic location codes to configure a cloned system.

FIG. 3 is a flowchart illustrating a method 300 for using generic location codes to configure a cloned system. Method 300 begins at block 302 by receiving a configuration template. The configuration template includes generic location codes generated as described above with reference to FIG. 2.

At block 304, a set of physical location codes on a target system (i.e., a system that is to be configured) is determined. For example, a set of physical location codes associated with card slots in an I/O enclosure 104 of the target system may be determined. The physical location codes may be determined as part of a discovery process that is executed on the target system.

At block 306, the physical location codes for the target system are sorted. The physical location codes for the target system are sorted using the same algorithm as for the source system. Thus in some implementations, the physical location codes are sorted in the order that devices or slots associated with the physical location codes were discovered on the target system.

At block 308 a map is generated that maps the physical location codes of the target system to generic location codes. The algorithm that generates the map is the same as the algorithm used to generate the map for the source system. Thus a unique portion of the physical location code is mapped to a generic location portion based on the order ordering used to sort the physical location codes.

At block 310, a set of physical location codes is generated based on the map determined at block 308 and the generic location codes in the configuration template. The set of physical location codes that are generated based on the inverse mapping of generic location codes to physical location codes will be referred to as template physical location codes.

At decision block 312, a check is made to determine if all entries in the set of template physical location codes are present in the set of physical location codes actually discovered on the target system. If all of the entries in the set of template physical location codes are present in the set of actual physical location codes for the target machine, then at block 314 a cloned configuration for the target system can be generated using the set of template physical location codes.

If the check at block 312 determines that at least one entry in the set of template physical location codes is not present in the set of actual physical location codes, the at block 316 an error is generated. The error conditions exists because the source system that serves as the basis for cloning the configuration has at least one enclosure, adapter card or other device that is not present in the target system.

FIGS. 4-7 are block diagrams depicting examples of physical location codes and corresponding generic location codes and maps for various example configuration scenarios.

Figure 4:
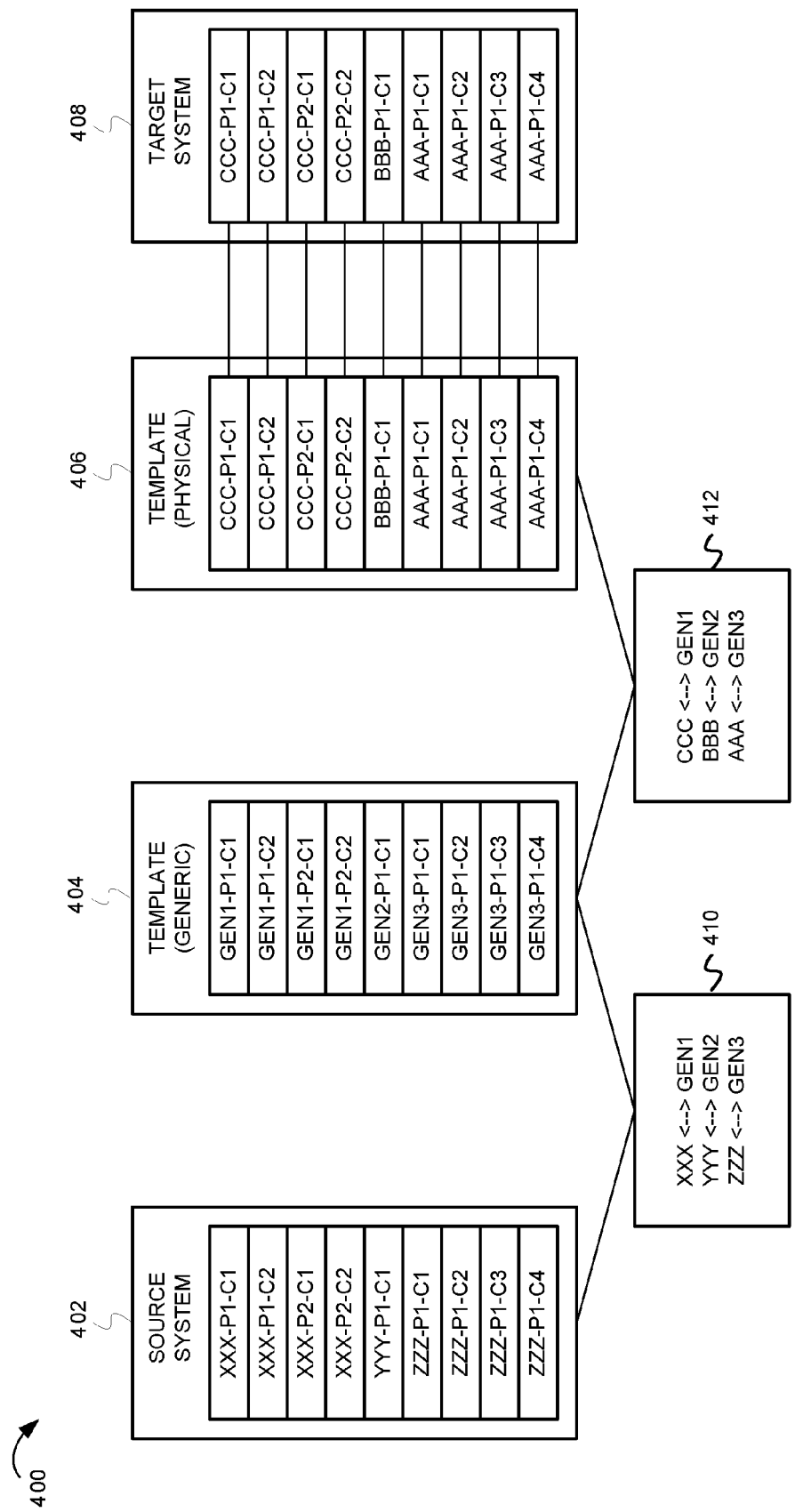
FIGS. 4-7 are block diagrams depicting examples of physical location codes and corresponding generic location codes.

FIG. 4 illustrates an example scenario 400 where there is a match between the hardware configuration of the source system and the hardware configuration of the target system. Map 410 is a map that is generated using the method described above with reference to FIG. 2. Source system physical location codes 402 are ordered (e.g., in discovery order) and mapped to generic location codes 404. In the example illustrated in FIG. 4, the prefixes "XXX", "YYY" and "ZZZ" are unique unit location codes for three I/O enclosures in the source system. The unique unit location codes "XXX", "YYY" and "ZZZ" are mapped to generic prefixes "GEN1", "GEN2" and "GEN3" respectively. Generic location codes 404 are stored in a configuration template for use in cloning the configuration to target systems.

In response to a request to clone the source system to a target system, a set of physical location codes 408 for the target system is generated. In the example illustrated in FIG. 4, the prefixes "AAA", "BBB" and "CCC" are unique location codes for three I/O enclosures in the target system. Map 412 is generated as described above with reference to FIG. 3 to map the unique location codes "AAA", "BBB" and "CCC" to generic prefixes "GEN1", "GEN2" and "GEN3" respectively.

Map 412 is then used to map the generic location codes 404 in the configuration template to template physical location codes 406. The set of template physical location codes 406 is compared to the actual physical location codes 408. In the example illustrated in FIG. 4, there is a one for one match between the physical location codes generated from the template and the actual physical location codes. As a result, the template can be used to generate a configuration that is a clone of the source system configuration, with the unique physical location codes of the source system replaced with the unique physical location codes of the target system.

Figure 5:
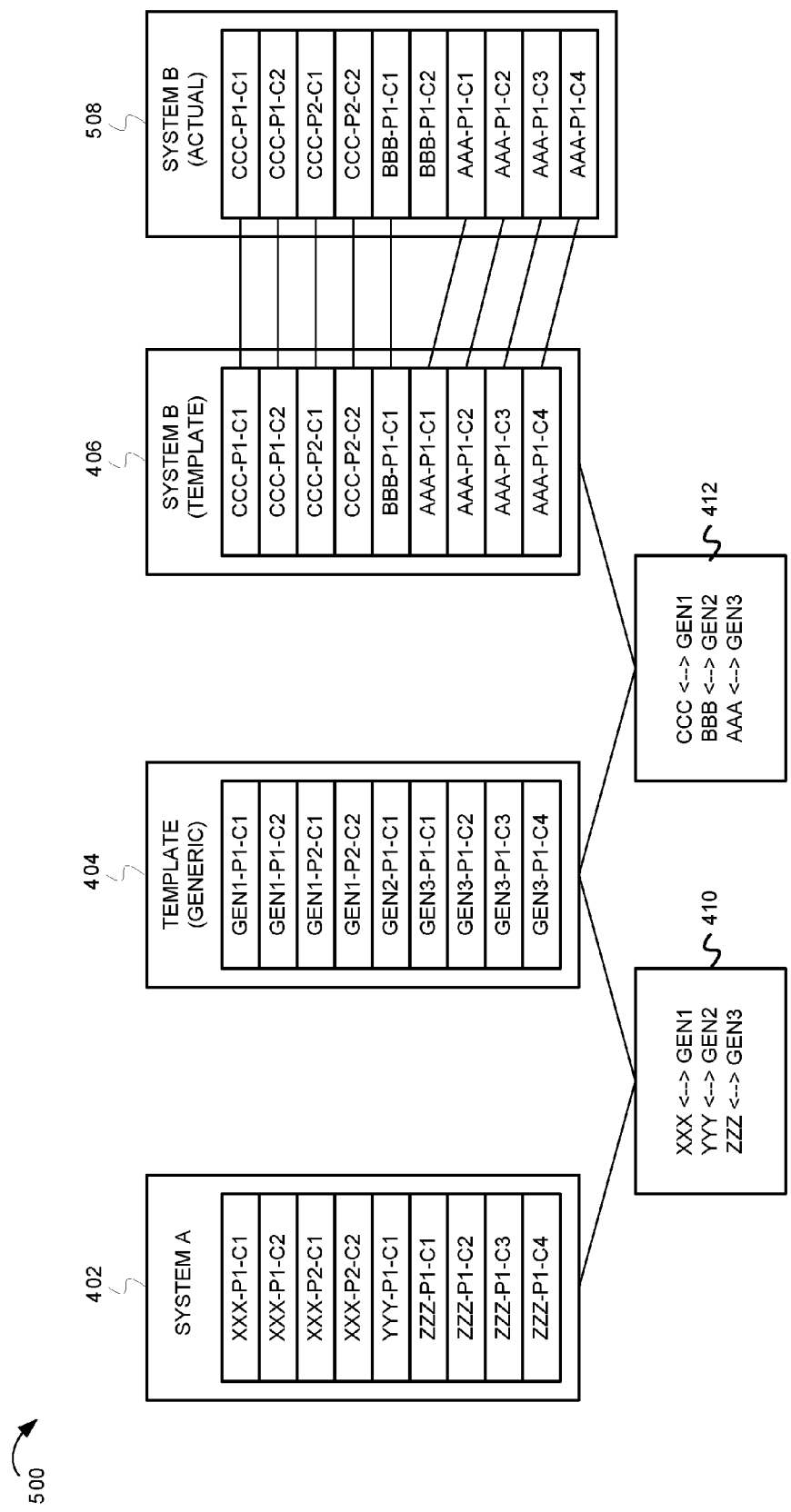

FIG. 5 illustrates an example scenario 500 where the target system has more physical location codes than the source system. Source physical location codes 402, generic location codes 404, template physical location codes 406, and maps 410 and 412 are as described above with respect to FIG. 4.

The set of actual physical location codes 508 for the target system is generated as described above with respect to FIG. 3. In the example illustrated in FIG. 5, the prefixes "AAA", "BBB" and "CCC" are unique location codes for three I/O enclosures in the target system. However, in this example, the actual physical location codes 508 include a physical location code "BBB-P1-C2" for an adapter card slot that is not present in the source system location codes 402. The set of template physical location codes 406 is compared to the actual physical location codes 508. In the example illustrated in FIG. 4, all of the physical location codes 406 generated from the template have a match in the set of actual physical location codes 508. As a result, the template can be used to generate a configuration that is a clone of the source system configuration, with the unique physical location codes of the source system replaced with the unique physical location codes of the target system. The presence of extra physical location codes in the actual physical location codes 508 is not an error because the extra physical location codes in the target system are not used in the template configuration.

Figure 6:
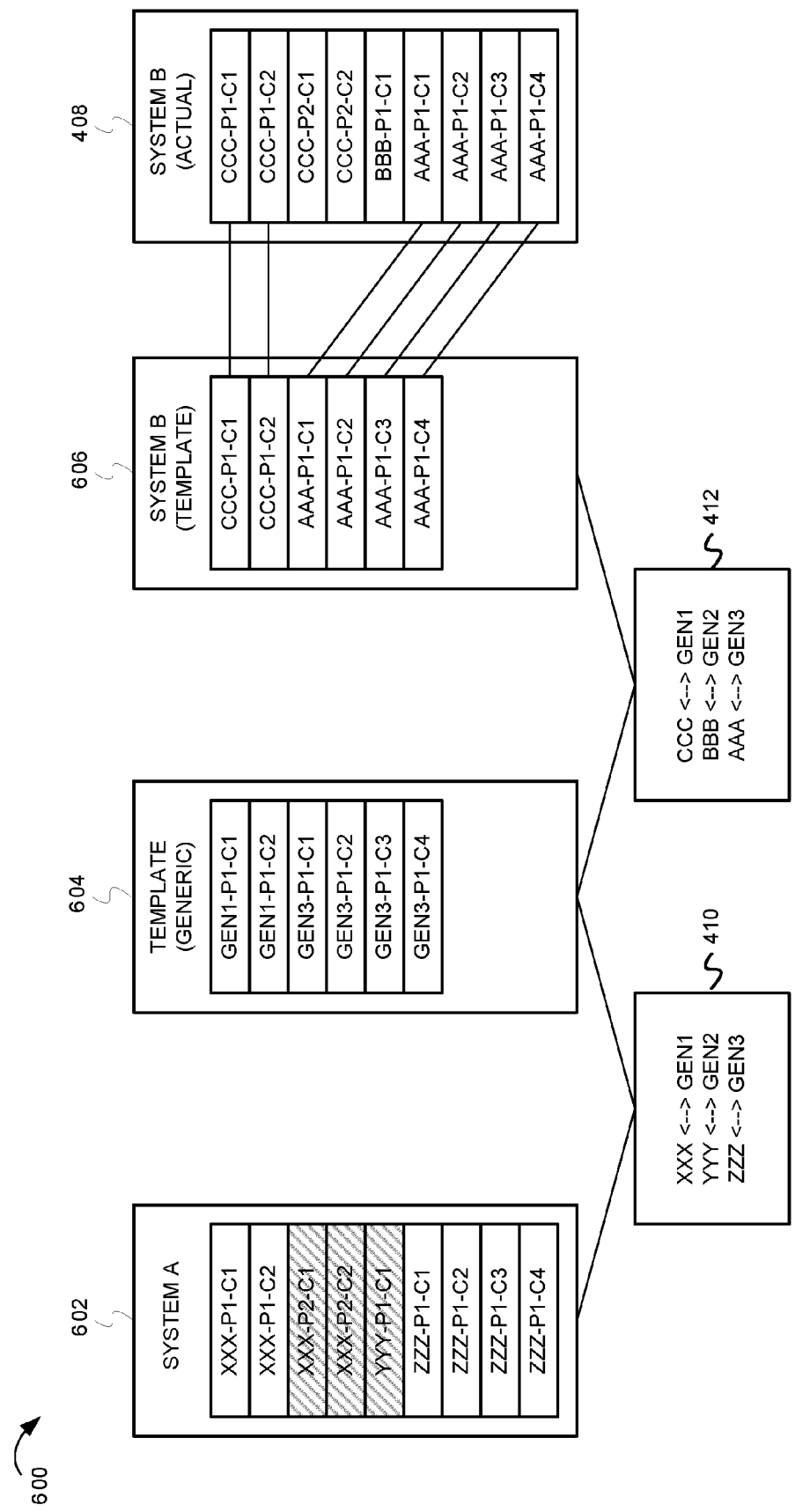

FIG. 6 illustrates an example scenario 600 where the source system has physical location codes that are not allocated to any virtual machines or other software components on the source system. Maps 410 and 412 are as described above with respect to FIG. 4. In this example, source physical location codes 602 include three physical location codes that are not assigned or allocated. In particular, physical location codes XXX-P2-C1, XXX-P2-C2 and YYY-P1-C1 are not allocated or assigned. As a result, in some embodiments, generic location codes 604 do not include any generic location codes that correspond to the unassigned physical location codes XXX-P2-C1, XXX-P2-C2 and YYY-P1-C1. Similarly, the template physical location codes 606 generated based on the map 412 and template generic location codes 604 do not include any physical location codes that correspond to the unassigned physical location codes in the source system.

The set of actual physical location codes 408 for the target system is generated as described above with respect to FIG. 3. In the example illustrated in FIG. 6, the actual physical location codes 408 include three physical location codes: CCC-P2-C1, CCC-P2-C2, and BBB-P1-C1 for adapter card slots that is not assigned or allocated in the source system location codes 402. The set of template physical location codes 606 is compared to the actual physical location codes 408. In the example illustrated in FIG. 6, all of the physical location codes 606 generated from the template have a match in the set of actual physical location codes 408. As a result, the template can be used to generate a configuration that is a clone of the source system configuration, with the unique physical location codes of the source system replaced with the unique physical location codes of the target system.

Like the example illustrated in FIG. 5, the presence of extra physical location codes in the actual physical location codes 408 is not an error because the extra physical location codes in the target system are not used in the template configuration.

Figure 7:
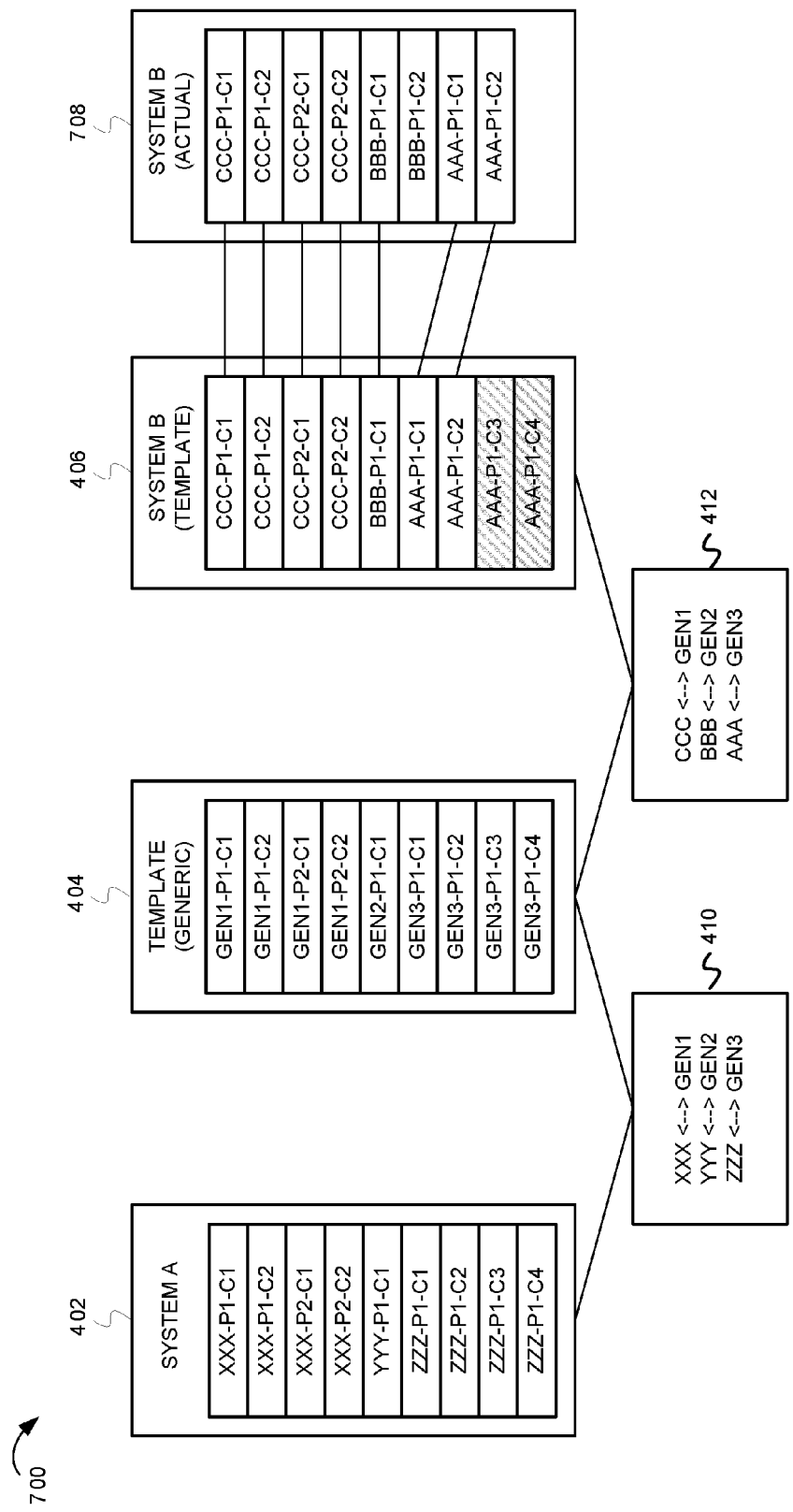

FIG. 7 illustrates an example scenario 700 where the target system a different arrangement of physical location codes than the source system, resulting in an error condition. Source physical location codes 402, generic location codes 404, template physical location codes 406, and maps 410 and 412 are as described above with respect to FIG. 4.

The set of actual physical location codes 708 for the target system is generated as described above with respect to FIG. 3. The set of template physical location codes 406 is compared to the actual physical location codes 708. In the example illustrated in FIG. 5, the actual physical location codes 708 for the target system include a physical location code BBB-P1-C2 for an adapter card slot that is not present in the source system location codes 402. As noted above, this is not an error condition. However, not all of the physical location codes 406 generated from the template have a match in the set of actual physical location codes 708. In particular, physical location codes AAA-P1-C3 and AAA-P1-C4 are generated based on the template generic location codes 404 and map 412. These two template physical location codes are not present in the set of actual physical location codes 708. Therefore it can be assumed that there are assigned mappings of physical location codes in the source system that cannot be cloned into the target system as a result of differences in hardware configuration. Thus an error condition may be generated.

The example scenarios illustrated in FIGS. 4-7 above are merely one small subset of the many possible scenarios that may exist. Those of skill in the art will appreciate that such other scenarios are possible and within the scope of the inventive s subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
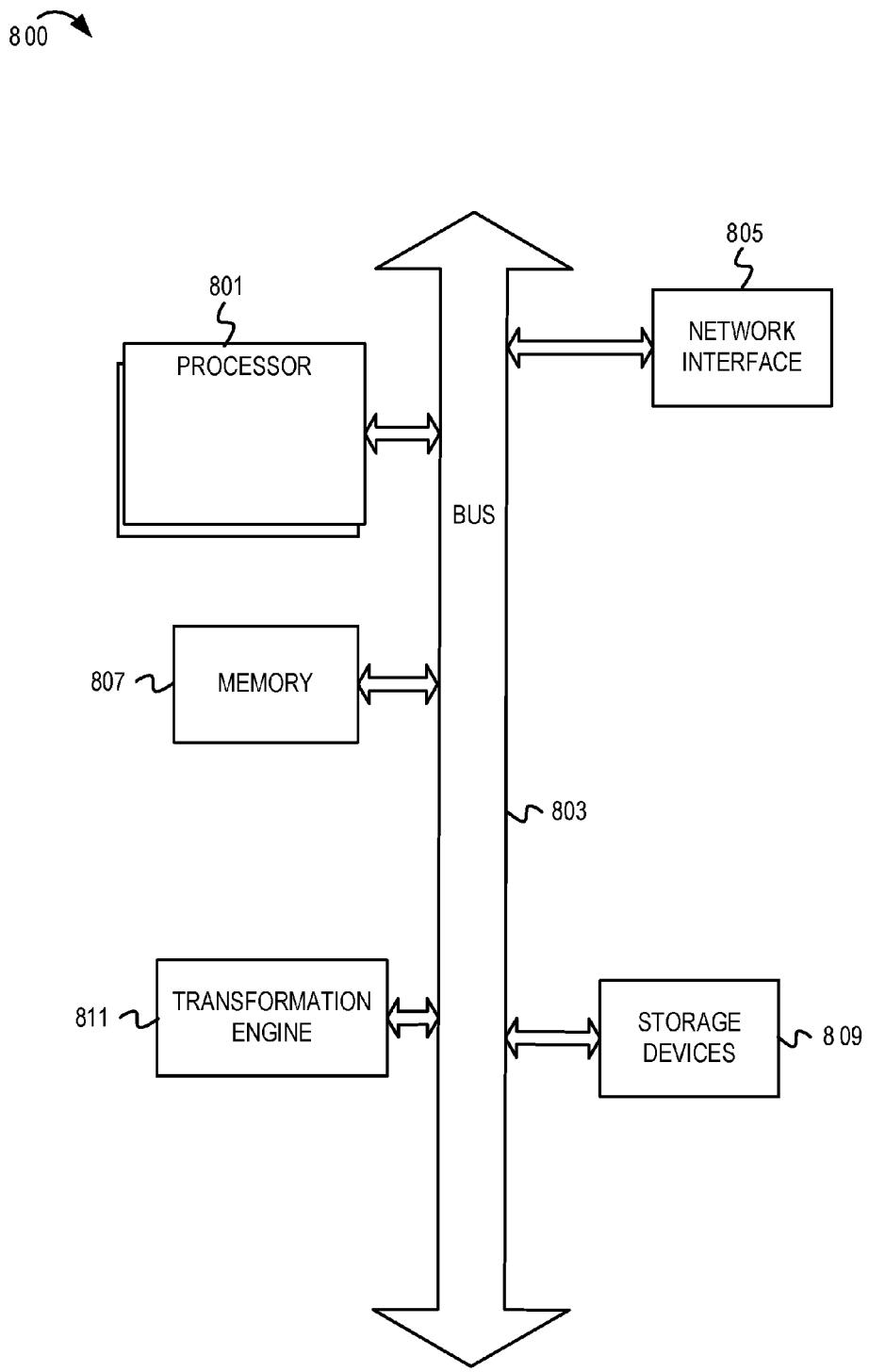
FIG. 8 is a block diagram illustrating an example computer system.

FIG. 8 depicts an example computer system. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The system memory 807 embodies functionality to implement embodiments described above. The system memory 807 may include one or more functionalities (e.g., transformation engine 811) that facilitate cloning a source system to a target system by using generic location codes to represent physical location codes. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them.

In general, techniques for cloning a source system to a target system by using generic location codes to represent physical location codes as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for cloning a machine configuration, the method comprising:
    determining, by one or more processors, a first set of physical location codes associated with a first set of adapter slots in a source machine;
    determining, by at least one of the one or more processors, a first order for the first set of physical location codes;
    determining, by at least one of the one or more processors, a first set of generic location codes; and
    generating, by the one or more processors, based at least in part on the first order, a first map that maps the first set of physical location codes to the first set of generic location codes;
    wherein the first map does not include physical location codes nor generic location codes for unassigned slots of a target computer system.

2. The method of claim 1, further comprising:
    determining a second set of physical location codes associated with a second set of adapter slots in a target machine;
    determining a second order for the second set of physical location codes;
    generating, based at least in part on the second order, a second map that maps the second set of physical location codes to a second set of generic location codes;
    generating a third set of physical location codes from the first set of generic location codes and the second map; and
    utilizing the third set of physical location codes in a configuration for the target machine.

3. The method of claim 2, further comprising:
    in response to determining that an entry in the third set of physical location codes is not present the second set of physical location codes, generating an error.

4. The method of claim 1, further comprising sorting the first set of physical location codes according to a discovery order.

5. The method of claim 1, further comprising reading the first set of generic location codes from a configuration template.

6. The method of claim 1, wherein a physical location code of the first set of physical location codes includes a first unique portion and a second non-unique portion, and wherein the first map includes a mapping from the first unique portion to a generic portion of a generic location code.

7. The method of claim 6, wherein the first unique portion identifies an input/output (I/O) enclosure and wherein the second non-unique portion identifies an adapter card slot within the I/O enclosure.

8. A system comprising:
one or more processors; and
a non-transitory computer readable storage medium communicably coupled to the one or more processors, the computer readable storage medium having program instructions embodied therewith, the program instructions executable by the one or more processors, the program instructions comprising:
program instructions to read a configuration file having a first set of generic location codes;
program instructions to determine a first set of physical location codes associated with a first set of adapter slots in a target machine;
program instructions to determine a first order for the first set of physical location codes;
program instructions to generate, based at least in part on the first order, a first map that maps the first set of physical location codes to a second set of generic location codes;
program instructions to generate a second set of physical location codes from the first set of generic location codes and the first map; and
program instructions to utilize the second set of physical location codes in a configuration for the target machine.

9. The system of claim 8, wherein the first set of physical location codes is sorted according to a discovery order.

10. The system of claim 8, wherein program instructions further include:
instructions to determine a third set of physical location codes associated with a second set of adapter slots in a source machine;
instructions to determine a second order for the third set of physical location codes; and
instructions to generate, based at least in part on the first order, a second map that maps the third set of physical location codes to the first set of generic location codes.

11. The system of claim 8, wherein a physical location code of the first set of physical location codes includes a first unique portion and a second non-unique portion, and wherein the first map includes a mapping from the first unique portion to a generic portion of a generic location code.

12. The system of claim 11, wherein the first unique portion identifies an input/output (I/O) enclosure and wherein the second non-unique portion identifies an adapter card slot within the I/O enclosure.

13. A computer program product for cloning a machine configuration, the computer program product comprising a non-transitory computer readable storage medium having program instructions embodied therewith, the program instructions executable by one or more processors, the program instructions including instructions to:
determine a first set of physical location codes associated with a first set of adapter slots in a source machine,
determine a first order for the first set of physical location codes, and
generate, based at least in part on the first order, a first map that maps the first set of physical location codes to a first set of generic location codes;
wherein unassigned slots are omitted from the mapping of the first set of physical location codes to the first set of generic location codes.

14. The computer program product of claim 13, wherein the program instructions further comprise program instructions to:
determine a second set of physical location codes associated with a second set of adapter slots in a target machine;
determine a second order for the second set of physical location codes;
generate, based at least in part on the second order, a second map that maps the second set of physical location codes to a second set of generic location codes;
generate a third set of physical location codes from the first set of generic location codes and the second map; and
utilize the third set of physical location codes in a configuration for the target machine.

15. The computer program product of claim 14, wherein the program instructions further comprise program instructions to, in response to a determination that an entry in the third set of physical location codes is not present the second set of physical location codes, generate an error.

16. The computer program product of claim 13, wherein the first set of physical location codes are sorted according to a discovery order.

17. The computer program product of claim 13, wherein the program instructions further comprise program instructions to read the first set of generic location codes from a configuration template.

18. The computer program product of claim 13, wherein a physical location code of the first set of physical location codes includes a first unique portion and a second non-unique portion, and wherein the first map includes a mapping from the first unique portion to a generic portion of a generic location code.

19. The computer program product of claim 18, wherein the first unique portion identifies an input/output (I/O) enclosure and wherein the second non-unique portion identifies an adapter card slot within the I/O enclosure.

* * * * *